United States Patent [19]
Lipari

[11] Patent Number: 6,155,093
[45] Date of Patent: Dec. 5, 2000

[54] METHOD OF FABRICATING METAL ELECTRONIC ENCLOSURES

[75] Inventor: John M. Lipari, Glenwood, N.J.

[73] Assignee: Coining Technologies, Inc., Clifton, N.J.

[21] Appl. No.: 09/336,226

[22] Filed: Jun. 18, 1999

[51] Int. Cl.[7] .................................................. B21D 28/02
[52] U.S. Cl. ................................ 72/341; 72/332; 72/254
[58] Field of Search ........................... 72/341, 340, 327, 72/326, 332, 356, 254

[56] References Cited

U.S. PATENT DOCUMENTS

| | | | |
|---|---|---|---|
| 5,502,994 | 4/1996 | Katoh | 72/327 |
| 5,920,981 | 7/1999 | Bushelle | 72/340 |
| 5,996,390 | 12/1999 | Tsujikawa | 72/340 |

FOREIGN PATENT DOCUMENTS

| | | | |
|---|---|---|---|
| 515678 | 2/1955 | Italy. | |
| 14158 | 2/1977 | Japan | 72/327 |

*Primary Examiner*—Daniel C. Crane
*Attorney, Agent, or Firm*—Greenberg Traurig LLP

[57] ABSTRACT

A method of forming metal enclosures specifically for electrical or electronic components which require precision in the formation of enclosure wells for containing the components. In accordance with the present invention the method comprises the steps of initially taking a metal blank having a depth thickness at least sufficient to accommodate a pre-determined enclosure well depth therein; determining the shape and depth of varying dimensions of the predetermined enclosure well; using a coining press and dies to separately cold form the determined shapes and depths which in toto form the desired well, and wherein each of the cold formings causes extrusion of a portion of metal to extend beyond the original depth thickness; after each cold forming with the coining press of the separate shapes and depth, using a metal removal device such as a grinder to remove the metal extrusion portion.

6 Claims, 2 Drawing Sheets

METHOD OF FABRICATING METAL ELECTRONIC ENCLOSURES

FIELD OF THE INVENTION

This invention relates to the fabrication of metal enclosures for small electronics such as hybrid circuits and electrical circuit boards and particularly to the fabrication of such enclosures with varying base depth levels/wells.

BACKGROUND OF THE INVENTION

It is currently the state of the art that enclosures for electrical circuits are made from precision shaped metal blocks. This shaping is however at a cost since it must be effected by expensive processes such as with milling/machining to achieve dimensional precision. Since the enclosures must be made with such high dimensional precision they require close tolerances in construction, and this is presently available only with milling/machining shaping processes. In addition, the metals used are limited since they must have coefficients of expansion which match the contained circuits since even slight deviations can adversely affect electrical connections performance. Accordingly, it has been the practice to form electrical enclosures from unitary metallic elements such as from blocks of KOVAR® alloy or other metal matched to the coefficient of expansion of the electronic or electrical element to be retained therein. In addition the enclosure wells are precisely milled/machined out of a metal (e.g., KOVAR slug or blank to provide a snug fit for the component to be contained therein.

While effective, milling or machining are relatively slow and expensive processes, even when utilized on a mass production basis, and especially if the production entails shaping changes in depth and configuration, as is often the case.

Simple and inexpensive metal forming processes, amenable to production line utilization, such as coining and stamping, because of the metal stretching involved, are inaccurate and susceptible to formation of unwanted holes in the stretched metal. Accordingly, use of such processes has not even been contemplated, except possibly for the formation of very simple enclosures not requiring a great degree of accuracy in the dimensions thereof.

SUMMARY OF THE INVENTION

It is accordingly an object of the present invention to provide an economical method for fabricating metal electronic enclosures without loss of precision in enclosure well dimension.

It is a further object of the present invention to provide such method to accommodate wells having non-uniform depth bases and shapes, with both speed and economy.

It is yet another object of the present invention to provide a means for enabling utilization of inexpensive production line coining processes in the formation of metal enclosures, but with acceptable accuracy in dimension and without excessive metal drawing and hole formation.

Generally the present invention comprises a method of forming metal enclosures specifically for electrical or electronic components which require precision in the formation of enclosure wells for containing the components. In accordance with the present invention the method comprises the steps of:

a) initially taking a metal blank having a depth thickness at least sufficient to accommodate a pre-determined enclosure well depth therein;

b) determining and preparing coining means of separate individual configuration and depth dimensional elements, of varying dimensions of a predetermined enclosure well;

c) successively using the separate individual coining means to separately cold form the individual determined configurations and depths which, in toto, form the desired well, and wherein each of said cold formings causes extrusion of a portion of metal to extend beyond the original depth thickness; and d) using metal removal means after each of said cold formings with the separate coining means, of the separate shapes and depth, to remove the respective metal extrusion portions.

The above and other objects, features and advantages of the present invention will become more evident from the following discussion and drawings in which:

SHORT DESCRIPTION OF THE DRAWINGS

FIGS. 1a–f sequentially illustrate the coining and grinding used in the steps of the present invention in providing an electronic component enclosure.

DETAILED DESCRIPTION OF THE INVENTION

In accordance with the present invention, a normally precision machined electronic component enclosure is, in effect, made by an inexpensive modified stamping or coining process without loss of precision, with substantially reduced cost. The milling/machining process is, in effect, broken down into separate configurational steps which are separately effected with separate coining steps and concomitant metal grinding (such as with a belt drive and grinding wheel) on a production line basis. As a result of the separation of individual coining steps there is no excessive metal stretching, accuracy is maintained and no unwanted holes are formed in the metal. Even though separate coining and grinding operations are required for more than basic or simple well formations, the cost thereof is still substantially below that of equivalent machining/milling operations. In addition, the procedure of the present invention is more amenable to a more rapid production line basis.

In a preferred embodiment of the present invention, separately coined configurations are separated according to depth and outer dimensions. Thus, in a stepped well configuration, a first step of lesser depth is initially coined in the blank, and extruded material is ground away from the outer surface. Then a deeper and larger well is coined onto the first coining to provide the overall stepped well structure and extruded metal material ground away to complete the enclosure. The process is repeated until the shaped well structure is obtained.

Though the coining steps result in intermediate metal extrusion, removal of the extruded metal is effected by a simple and relatively inexpensive leveling grinding process utilizing a conveyor belt and grinding wheel rather than by an expensive milling or machining process which utilizes shaping bits.

As described, in a preferred embodiment the deeper coinings are initially effected according to depth, particularly when the coinings are overlapping, in order to minimize even minor distortion. Since the individual coinings are of a single depth and simple dimension, distortion is minimized and a dimensionally precise well is obtained at each step. Furthermore, in sum total the overall well configuration is obtained with dimensional precision rivalling that of the more expensive milling/machining procedures even when the total of wells are taken into consideration.

The coining steps of the present invention are generally effected with standard stamping procedures, and with metals such as KOVAR by using 60–175 ton hydraulic presses. The grinding operations and steps are effected through a standard feed grinder and production conveyor belt system.

Lubricants used during the coining steps are industry standard lubricants such as graphite and molybdenum disulfide based lubricants.

DETAILED DESCRIPTION OF THE DRAWINGS AND THE PREFERRED EMBODIMENT

Figure 1A:
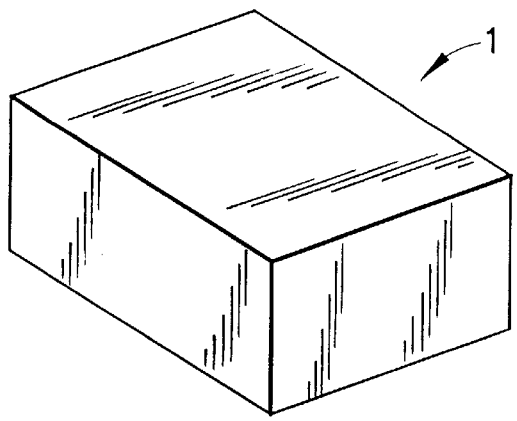
Figure 1B:
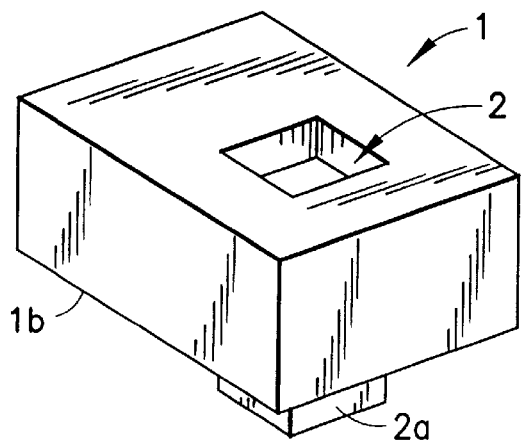
Figure 1C:
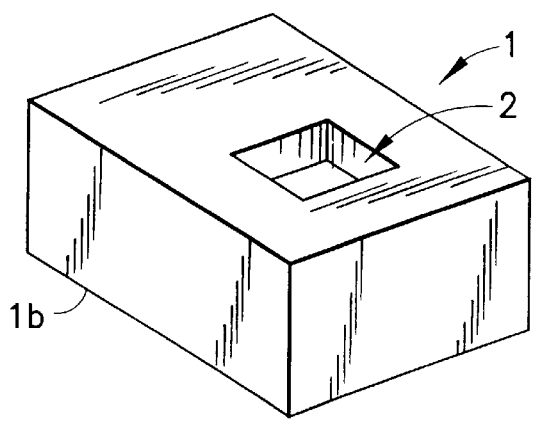
Figure 1D:
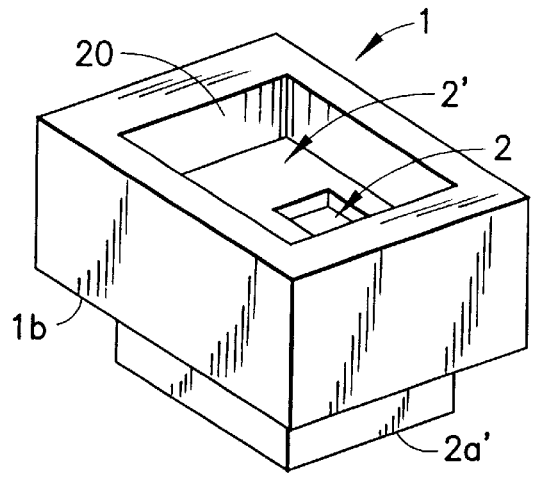
Figure 1E:
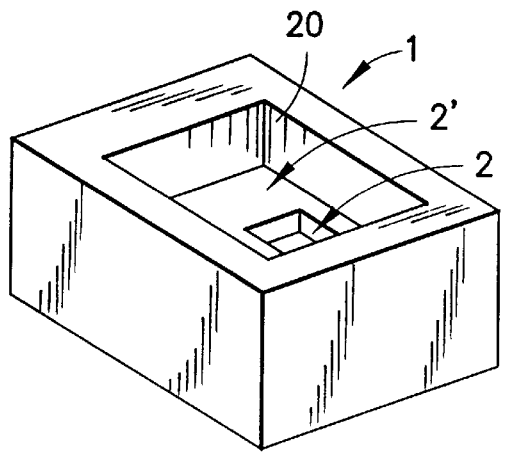
Figure 1F:
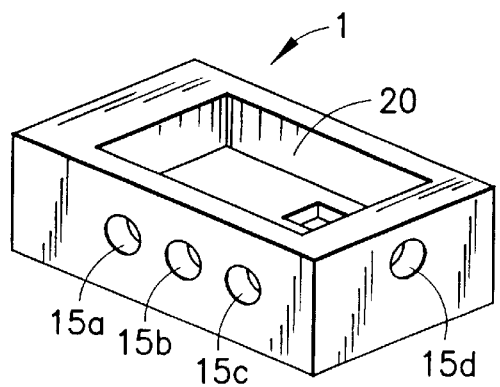

With reference to the drawings, a bi-level well is shown as being formed in a block of KOVAR material by successive coining and grinding procedures. FIG. 1a depicts the solid rectangular blank 1 of KOVAR material, with the requisite external dimensions, which is used to form an electronic enclosure. In a first processing step shown in FIG. 1b the blank 1 is coined with a 60–175 ton hydraulic press with a rectangular die to impress rectangular well 2 into blank 1. With the coining, section 2a is made to protrude beyond the bottom surface 1b of blank 1. In a second processing step, shown in FIG. 1c, section 2a is ground away by a grinding wheel (not shown) until it becomes flush with bottom surface 1b of the blank. In a third processing step shown in FIG. 1d, a second die coining is effected on the blank to provide deeper well section 2' while depressing originally well section 2 therein. Section 2a' is thereby made to protrude beyond the bottom surface 1b of blank 1. As with section 2a, section 2a' is ground away until it too becomes flush with bottom surface 1b of the blank to complete overall well 20 with component wells 2 and 2'. The internal dimensions are dimensionally precise since the successive coining steps do not affect dimensions and structure obtained with the prior steps. The formed block is then processed according with other structural requirements such as piercing for the formation of apertures 15a–d, as shown in FIG. 1f, to complete the structure without expensive machining.

It is understood that the above example and drawings are merely illustrative of the present invention and that changes may be made to structure steps and materials without departing from the scope of the present invention as defined in the following claims.

What is claimed is:

1. A method of forming a metal enclosure for electronic components, comprising the steps of:
    a) initially taking a metal blank having a depth thickness at least sufficient to accommodate a pre-determined enclosure well depth therein;
    b) determining and preparing coining means of separate individual configuration and depth dimensional elements, of varying dimensions of a predetermined enclosure well;
    c) successively using the separate individual coining means to separately cold form a plurality of the individual determined configurations and depths which, in toto, form the desired well, and wherein each of said cold formings causes extrusion of a portion of metal to extend beyond the original depth thickness; and
    d) using metal removal means after each of said cold formings with the separate coining means, of the separate shapes and depth, to remove the respective metal extrusion portions.

2. The method of claim 1, wherein the separate individual coining means provide the cold forming of component configurations of the predetermined enclosure wells are of different depth dimension.

3. The method of claim 2, wherein shallower depths of said component configurations are cold formed prior to deeper depths of the components configurations.

4. The method of claim 1, wherein said metal removing means comprises metal grinding means.

5. The method of claim 4, wherein said metal grinding means comprises a grinding wheel.

6. The method of claim 1, wherein said cold forming is effected with coining means comprising an hydraulic press with a coining pressure of between 60 to 175 tons.

* * * * *